J. SCHMOLLER.
MEASURING CONTAINER.
APPLICATION FILED JUNE 30, 1916.
1,222,245.
Patented Apr. 10, 1917.
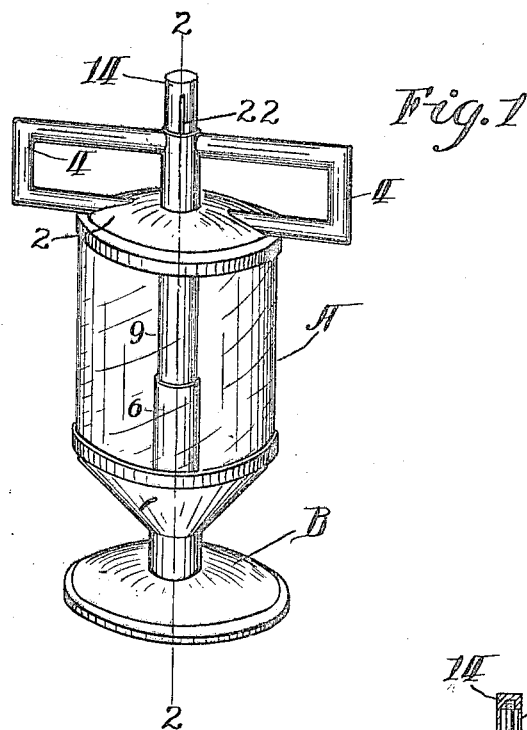
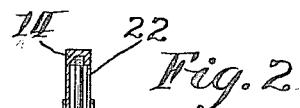
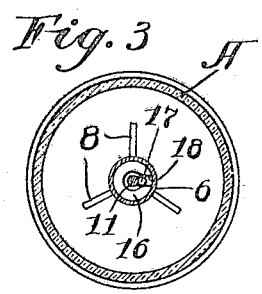
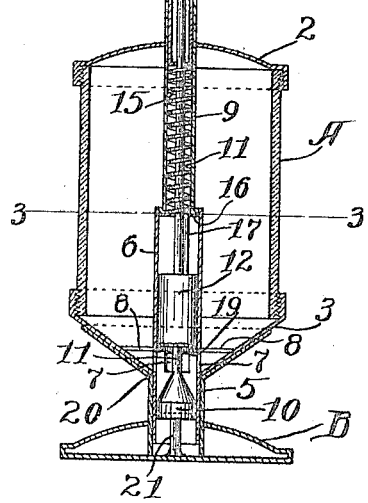
Inventor:
John Schmoller
by: Lathrop & Johnson
Attys.

UNITED STATES PATENT OFFICE.

JOHN SCHMOLLER, OF ST. PAUL, MINNESOTA.

MEASURING-CONTAINER.

1,222,245.

Specification of Letters Patent.

Patented Apr. 10, 1917.

Application filed June 30, 1916. Serial No. 106,321.

*To all whom it may concern:*

Be it known that I, JOHN SCHMOLLER, a citizen of the United States, residing at St. Paul, in the county of Ramsey and State of Minnesota, have invented certain new and useful Improvements in Measuring-Containers, of which the following is a specification.

My invention relates to improvements in containers for sugar and the like provided with means whereby the contents may be ejected in predetermined quantities. The object of my invention particularly is to provide a construction of container which will be normally closed so as to protect the contents as from flies, etc., and from which the contents may be easily ejected in proper quantities for use without opening the container and exposing the contents.

To this end my invention consists of the features of construction and combination hereinafter particularly described and claimed.

In the accompanying drawings forming a part of this specification,

Figure 1 is an elevation of my improved container.

Fig. 2 is a section on line 2—2 of Fig. 1.

Fig. 3 is a section on line 3—3 of Fig. 2.

Referring to the drawings, A represents a container, preferably of glass, having a screw supported cover 2, and a similarly supported bottom 3. The cover 2 is shown formed with a pair of opposed outwardly projecting handles 4, and the bottom is formed with a central downwardly projecting outlet tube 5. Within the receptacle a tube extends upwardly from the outlet 5, said tube 6 being formed with a plurality of port holes 7 adjacent the bottom of the container. The tube 6 is braced, as by ribs 8 extending from the lower end of the tube 6 to the bottom of the container. The tube 6 is connected with a similar tube 9 forming a continuation of said tube 6 and extending upwardly through the cap 2. Slidable within the tubes 6 and 9 is a plunger 10 normally closing the lower end of the discharge tube 5. A coil spring 15 is interposed between the finger slide 14 and a flange 16 extending inwardly from the upper end of the tube 6, said spring surrounding the rod 11 and normally holding the rod and connected parts raised. Rotation of the rod and connected parts is prevented by means of a rib 17 extending outwardly from one side of the rod above the piston valve 12, said flange fitting within a slot 18 in the flange 16. For the purpose hereinafter pointed out the bottom 19 of the piston valve 12 is hollowed and the plunger 10 is tapered inwardly as shown.

B. represents a supporting stand for the container. The supporting stand is formed with a central socket opening 20 into which the outlet tube 5 of the container will fit as shown in Fig. 2, a pin 21 projecting upwardly from the bottom of the socket opening to make contact with the plunger and prevent the plunger being pushed down when the container is positioned in said opening.

In operation the container will be supported by the holder when not in use. When it is desired to eject from the container a measure of the contents the container will be removed from the holder and the finger portion 14 depressed to shove the plunger out of the discharge tube 5 and allow the sugar between the valve 12 and the plunger to drop from the discharge tube. It will be evident the valve piston 12 will move past the port holes to close them before the plunger leaves the tube 5 thus imprisoning between the plunger and valve piston a predetermined measure of the contents, which as stated, will drop from the end of tube 5 when the plunger passes beyond the tube. The inward tapering of the plunger heretofore described forms a retention chamber for the sugar between the plunger and the piston valve. The hollowing out of the lower end of the piston valve assists in forming a cutting edge to break up lumps or compacted sugar.

The finger portion 14, as shown, is formed with side slotted opening 22 to allow the escape of air as the parts are shoved down, preventing interference with the working of the parts by compression of any air below the finger portion. The double handle allows the device to be grasped by either side and be firmly and easily held while depressing the finger portion, to eject the sugar. As will be evident only the amount of sugar imprisoned between the plunger and the piston valve will be allowed to escape, as the plunger is actuated by pressing down of the finger portion 14, and a second measure of the contents can only be allowed to escape by a second depression of the movable parts. The container at all times may thus remain closed, protecting the contents and I thus secure a thoroughly sanitary, as well as an economical measuring construction of container.

I claim:—

1. An article of the class described, comprising a container having an outlet opening, a measuring plunger slidably positioned in said opening and formed with a finger engageable part projecting beyond the top of the container, and a stand for said container, said stand being provided with a portion normally engaged with and preventing said plunger being depressed when said plunger is in position upon the stand.

2. An article of the class described, comprising a container having an outlet opening, a measuring plunger slidably positioned in said opening and formed with a finger engageable part projecting beyond the top of the container, and a stand for said container, said stand being provided with an upwardly projecting stop forming an abutment for said plunger to prevent the same being depressed when the said container is in position upon the stand.

In testimony whereof I affix my signature in presence of a witness.

JOHN SCHMOLLER.

Witness:
H. S. JOHNSON.

Copies of this patent may be obtained for five cents each, by addressing the "Commissioner of Patents, Washington, D. C."